United States Patent
Yan et al.

(10) Patent No.: US 10,110,427 B2
(45) Date of Patent: Oct. 23, 2018

(54) DISTRIBUTING CONTENT BASED ON WEIGHTS ASSOCIATED WITH USERS SPECIFIED BY CONTENT PROVIDER SYSTEMS

(71) Applicant: Facebook, Inc., Menlo Park, CA (US)

(72) Inventors: Jinghao Yan, Cupertino, CA (US); Lee Charles Linden, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 59 days.

(21) Appl. No.: 15/201,239

(22) Filed: Jul. 1, 2016

(65) Prior Publication Data
US 2018/0007120 A1    Jan. 4, 2018

(51) Int. Cl.
*H04L 29/08* (2006.01)
*H04L 12/24* (2006.01)

(52) U.S. Cl.
CPC ........ *H04L 41/0803* (2013.01); *H04L 67/306* (2013.01); *H04L 67/327* (2013.01); *H05K 999/99* (2013.01)

(58) Field of Classification Search
CPC .......... G06F 17/30867; G06F 17/3053; G06F 17/30905; G06F 17/30241; G06Q 50/01; G06Q 30/02; G06Q 10/10; G06Q 30/0203; H04L 65/403; H04L 67/22
See application file for complete search history.

(56) References Cited

U.S. PATENT DOCUMENTS

| | | | |
|---|---|---|---|
| 8,126,904 B1* | 2/2012 | Bettinger | G06Q 10/06 707/609 |
| 2009/0171754 A1* | 7/2009 | Kane | G06F 17/30867 705/14.53 |
| 2010/0042608 A1* | 2/2010 | Kane, Jr. | G06F 17/30867 707/732 |
| 2010/0076994 A1* | 3/2010 | Soroca | G06F 17/30749 707/769 |
| 2010/0094878 A1* | 4/2010 | Soroca | G06F 17/30035 707/748 |
| 2011/0125739 A1* | 5/2011 | Wexler | G06F 17/30867 707/734 |
| 2011/0258049 A1* | 10/2011 | Ramer | G06F 17/30867 705/14.66 |
| 2012/0173358 A1* | 7/2012 | Soroca | G06Q 30/02 705/26.3 |
| 2012/0173367 A1* | 7/2012 | Soroca | G06Q 30/08 705/26.3 |
| 2012/0173370 A1* | 7/2012 | Soroca | G06O 30/0241 705/26.3 |

(Continued)

*Primary Examiner* — Ninos Donabed
(74) *Attorney, Agent, or Firm* — Fenwick & West LLP

(57) ABSTRACT

A content publishing system receives content items from content provider systems for providing to users. The content publishing system further receives mapping tables from the content provider systems specifying weights for users of the content provider systems. The content publishing system provides content items to users based on the user specific weights received from the content provider systems. As a result, a content provider system can identify users that are likely to be interested in specific content items and assigns weights to these users to adjust the likelihood of the users receiving appropriate content items via the content publishing system.

15 Claims, 6 Drawing Sheets

(56) References Cited

U.S. PATENT DOCUMENTS

| | | | |
|---|---|---|---|
| 2012/0173373 A1* | 7/2012 | Soroca | G06F 17/30867 705/26.3 |
| 2012/0179563 A1* | 7/2012 | Soroca | G06Q 30/02 705/26.3 |
| 2012/0179564 A1* | 7/2012 | Soroca | G06Q 30/02 705/26.3 |
| 2013/0055097 A1* | 2/2013 | Soroca | G06O 30/0247 715/738 |
| 2014/0236772 A1* | 8/2014 | McCoy | G06Q 30/0635 705/26.81 |
| 2015/0127565 A1* | 5/2015 | Chevalier | G06Q 10/00 705/319 |
| 2015/0213022 A1* | 7/2015 | Agarwal | G06F 17/3053 707/731 |
| 2015/0213119 A1* | 7/2015 | Agarwal | G06Q 10/10 707/737 |
| 2016/0277485 A1* | 9/2016 | Abrams | G06F 17/30867 |

* cited by examiner

User ID Mapping Table 250

| Content Provider System User ID | Content Provider System ID | Content Publishing System User ID |
|---|---|---|
| Ia1 | P1 | Ib1 |
| Ia2 | P1 | Ib2 |
| Ia3 | P1 | Ib3 |
| Ia4 | P1 | Ib4 |
| Ia1 | P2 | Ib5 |

Local User Weight Mapping Table 265 received from a content provider system

| Content Provider System User ID | Content Item ID | User Weight |
|---|---|---|
| Ia1 | C1 | w1 |
| Ia2 | C1 | w2 |
| Ia2 | C2 | w3 |
| Ia3 | C2 | w4 |
| Ia4 | C3 | w5 |

Global User Weight Mapping Table 255

| Row ID | Content Publishing System User ID | Content Provider system ID | Content Item ID | User Weight |
|---|---|---|---|---|
| row1 | Ib1 | P1 | C1 | w1 |
| row2 | Ib2 | P1 | C1 | w2 |
| row3 | Ib2 | P1 | C2 | w3 |
| row4 | Ib3 | P1 | C2 | w4 |
| row5 | Ib4 | P1 | C3 | w5 |
| row6 | Ib1 | P2 | C4 | w6 |
| row7 | Ib2 | P2 | C5 | w7 |

FIG. 4

DISTRIBUTING CONTENT BASED ON WEIGHTS ASSOCIATED WITH USERS SPECIFIED BY CONTENT PROVIDER SYSTEMS

BACKGROUND

This disclosure relates in general to distributing content received by a content publishing system from content provider system, and in particular, to distributing content by a content publishing system based on weights assigned to individual users by the content provider system.

A content publishing system receives content from content provider systems for publishing to users. Content provider systems typically provide targeting criteria for selectively targeting users, for example, targeting criteria based on demographic attributes. This allows content provider systems to target content items to users with specific attributes. For example, the content provider system may specify that a content item should be targeted to users of a specific gender belonging to a particular age group.

Content publishing systems typically ensure privacy of information provided by users. However, if a content publishing system provides information to a content provider system identifying a user to whom a content item was provided, the content provider system can infer attributes describing the user. For example, if the content publishing system provides information to content provider system indicating that a particular user was presented with a content item targeted towards males in the age group 20-25, the content provider system can infer that the user must have male gender and age within range 20-25. In this situation, the content publishing system failed to ensure privacy of the user information by leaking user information to the content provider system. If a content publishing system does not ensure privacy of user information, users would prefer not to provide their information to the content publishing system. As a result, the content publishing system would lose subscribers and in turn revenue based on the subscribers.

SUMMARY

A content publishing system receives content items from content provider systems for providing to users. The content publishing system further receives mapping tables from the content provider systems that specify weights for users of the content provider systems. For example, the content provider system may weigh users based on a likelihood of the user being interested in a content item. A content provider system may determine a weight associated with a user based on the user's interactions with the content provider system. For example, if the user performed searches via the content provider system for topics related to a content item, the content provider system may determine that the user is likely to be interested in the content item. Accordingly, the content provider system may assign high weight to the user for that content item. The content provider system provides a mapping from users to weights associated with the users to the content publishing system. The content publishing system uses the mapping to select content items for providing to users.

The content publishing system performs the following steps repeatedly to send content items to users. The content publishing system receives a request from a user and configures a web page in response to the user request. The content publishing system identifies a plurality of content items as potential candidates for including in the web page. The content publishing system determines weights associated with the user from the mappings received from content provider systems that provided the identified content items. The content publishing system selects a content item based on the weights. The content publishing system provides access to the selected content item via the configured web page and sends the configured web page to a client device of the user.

The content publishing system generates a report that aggregates information over the plurality of users and sends the report to the content provider system. Aggregating the information over a plurality of users ensures that the content provider system is unable to extract information describing specific users. This allows the content publishing system to ensure privacy of users of the content publishing system.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

FIG. 4 is illustrates the merging of local user weight mapping tables received from content provider systems into a global mapping table by a content publishing system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overall System Environment

Figure 1:
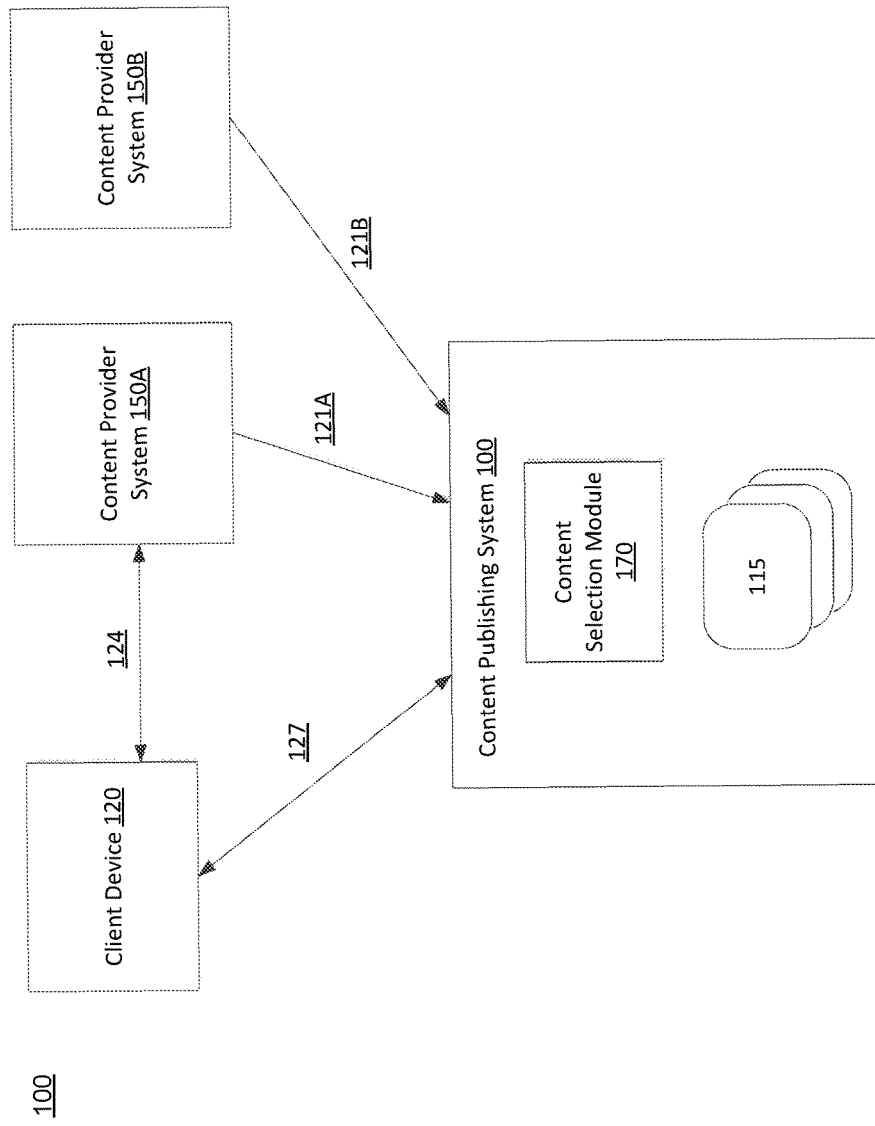
FIG. 1 shows a system environment illustrating the interactions between a content publishing system, a content provider system, and a client device, in accordance with an embodiment of the invention.

FIG. 1 shows a system environment illustrating the interactions between a content publishing system, a content provider system, and a client device, in accordance with an embodiment of the invention. Other embodiments may include more or fewer systems than those indicated in FIG. 1. For example, typically there are a large number of client devices 120 interacting with the content publishing system 100.

FIG. 1 and the other figures use like reference numerals to identify like elements. A letter after a reference numeral, such as "160A," indicates that the text refers specifically to the element having that particular reference numeral. A reference numeral in the text without a following letter, such as "160," refers to any or all of the elements in the figures bearing that reference numeral (e.g. "160" in the text refers to reference numerals "160A" and/or "160B" in the figures).

The content publishing system 100 provides certain types of services to users via client devices 120. The content publishing system 100 provides content to client devices 120. The content publishing system 100 may provide other services in addition to providing content, for example, by allowing users to interact with other users, share content, post comments, make purchases, and so on. In an embodiment, the content publishing system 100 is a social networking system that allows users to establish connections with other users, interact with the connections of the user, receive information describing various actions performed by the connections of the user, and so on.

The content publishing system receives requests from client devices 120 and sends web pages to the client devices 120 in response. The content publishing system 100 receives content 115 from one or more content provider systems 150 and includes the content in web pages sent to the client device 120. The content received by the content publishing system 100 from the content provider systems 150 may be promotional content or sponsored content. Accordingly, a content provider system 150 provides remuneration to the content publishing system 100 for publishing content of the content provider system.

A user interacts 127 with the content publishing system 100 via a client device 120. The content publishing system 100 receives requests for interaction with the content publishing system 100 from client devices 120. The content publishing system 100 configures a web page for sending to the client device 120. The content publishing system 100 configures the web page such that a portion of the web page is used for providing the information requested by the user or for receiving user interactions specific to the features offered by the content publishing system 100. The content publishing system 100 configures the web page such that at least a portion of the web page is available for presenting content received from a third party such as the content provider system 150. The content publishing system 100 may include a link to the content in the web page for allowing the user to access the content using the link.

The content publishing system 100 identifies a plurality of content items as potential candidates for including in the web page. The content publishing system 100 selects a content item from the plurality of identified content items for including in the web page. Each identified content item may be provided by a different content provider system 150. Each content provider system 150 provides the content publishing system 100 with a measure of an amount of remuneration that the content provider system 150 would provide to the content publishing system 100 as a compensation for presenting the content item to the user. The content publishing system 100 selects a content item from the plurality of content items based on the amounts of remuneration specified by the content provider systems 150. For example, the content publishing system 100 may select the content item of the content provider system 150 that specifies the highest remuneration for publishing its content item.

The content provider system 150 may also offer certain services to users, for example, by allowing users to perform searches, to purchase items, to access content, and so on. Users provide value to the content provider system 150 by interacting with the content provider system 150. For example, a user making frequent purchases via the content provider system 150 may be considered more valuable by the content provider system 150. Accordingly, the content provider system 150 associates users with weights. A weight may be proportionate to a value of the user as measured by the content provider system. The content provider system may determine whether the user is likely to perform interactions associated with the content provider system that provide value to the content provider system and assign a weight to the user accordingly. Accordingly, some users may be weighted higher than other users.

In an embodiment, a content provider system 150 provides 121 the content publishing system 100 with a mapping that associates users with weights. The content provider system 150 specifies that the amount of remuneration specified by the content provider system 150 would be weighted for a specific user according to the weight assigned to the user in the mapping. For example, a user u1 may be associated with weight w1 and another user u2 may be associated with the weight w2 and the amount of remuneration specified by the content provider system 150 for presenting content items to users is N. If the content publishing system 100 presents a content item received from the content provider system 150 to a user, the content provider system 150 would provide w1*N remuneration to the content publishing system 100 if the content item was presented to user u1 and w2*N if the content was presented to user u2.

In an embodiment, the content provider system associates users with weights for specific content items. The content publishing system selects content items for presenting to a user based on the weights received from content provider systems. For example, the weight associated with user u1 for content item C1 may be w11 and the weight associated with user u1 for content item C2 may be w12. Similarly, the weight associated with user u2 for content item C1 may be w21 and the weight associated with user u2 for content item C2 may be w22. Accordingly, if the content publishing system 100 presents content item C1 to users u1, the content provider system 150 would provide w11*N remuneration to the content publishing system 100; if the content publishing system 100 presents content item C2 to users u1, the content provider system 150 would provide w12*N remuneration to the content publishing system 100; if the content publishing system 100 presents content item C1 to users u2, the content provider system 150 would provide w21*N remuneration to the content publishing system 100; and if the content publishing system 100 presents content item C2 to users u2, the content provider system 150 would provide w22*N remuneration to the content publishing system 100.

The ability to associate individual users with specific weights allows the content provider system 150 to treat each user differently. For example, the content provider system 150 may determine based on previous interactions of a user with the content provider system 150, that a particular user u1 provides more value to the content provider system 150 compared to another user u2, for example, by making purchases via the content provider system 150. Accordingly, the content provider system 150 associates the user u1 with a higher weight compared to user u2. This increases the chances that the content publishing system 100 would present content received from the content provider system 150 to the user.

Different content provider systems 150 may specify different mappings from users to weights. Accordingly, the same user may be weighted differently by different content provider systems. Furthermore, for a particular user, a content provider system 150A may specify a weight but content provider system 150B may not specify any weight. If the content publishing system 100 does not receive any weight for a user in a mapping received from a content provider system 150, the content publishing system 100 selects content items based on the amount of remuneration specified by the content provider system 150 without weighing the amount of remuneration. Accordingly, if no weight is specified for a user in a mapping received from a content provider system 100, the content publishing system 100 assumes a default value of 1 as the weight for that user for content items received from that content provider system 150. Alternatively, different content provider systems 150 may associate the same user with different weights or a user may not be associated with weight by any content provider system 150.

Each content provider system 150 uses a mechanism to identify users, for example, by associating each user with an identifier (or id) that is unique within the content provider system 150. The content publishing system 100 also associates each user with an identifier that is unique within the content publishing system 100. The user identifiers may not be unique across various systems. For example, the same user identifier value may be used by the content publishing system 100 for a particular user and by a content provider system 150 for another user. The content publishing system 100 maps user identifiers of the content publishing system 100 to user identifiers of the different content provider systems 150. Accordingly, a content provider system 150 may provide the content publishing system 100 with a mapping associating user identifiers of the content provider system 150 with weights. The content publishing system 100 translates these mapping to a mapping from user identifiers of the content publishing system 100 to the corresponding weights.

System Architecture

Figure 2A:
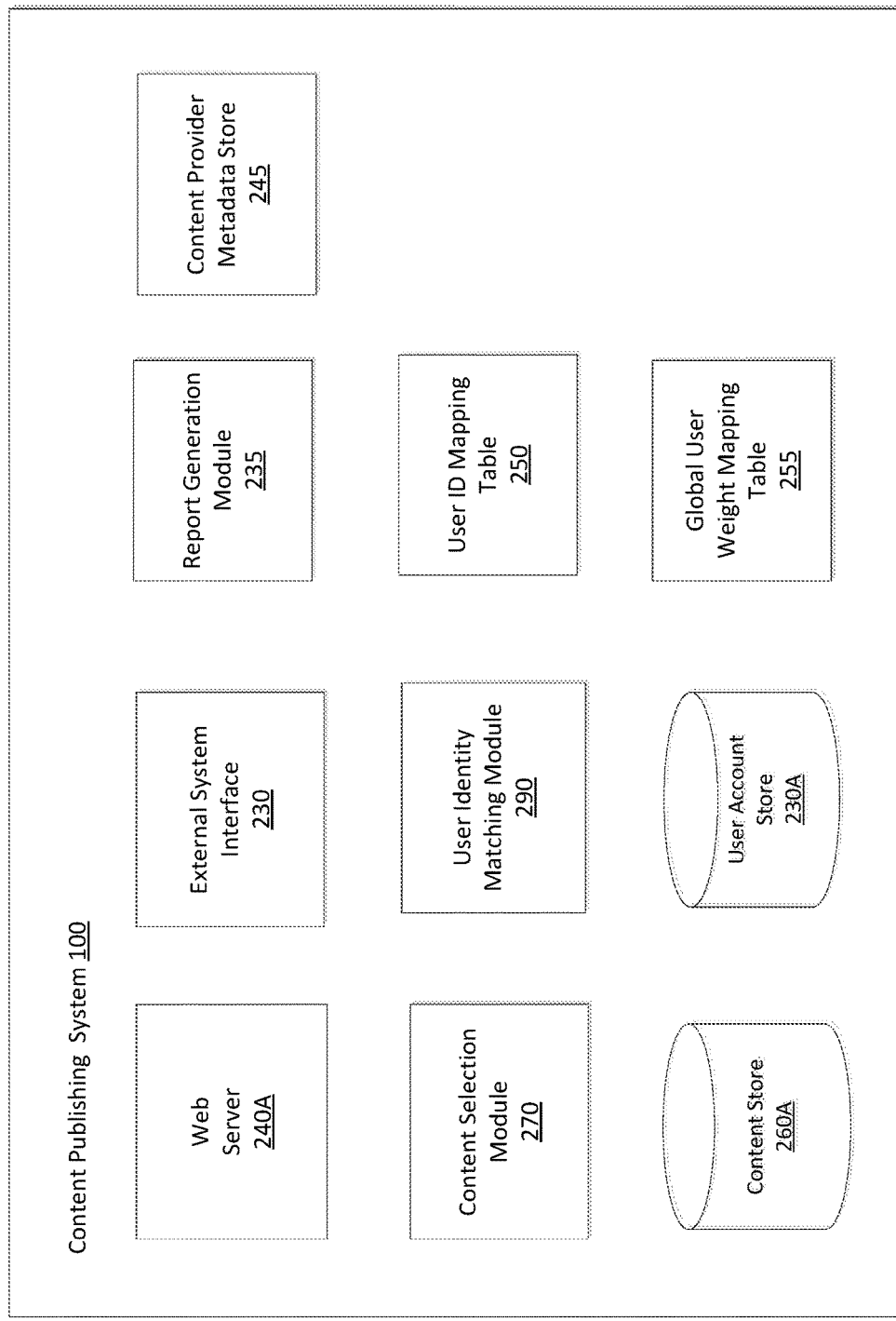
FIG. 2A is a block diagram illustrating the system architecture of a content publishing system, in accordance with an embodiment of the invention.
Figure 2C:
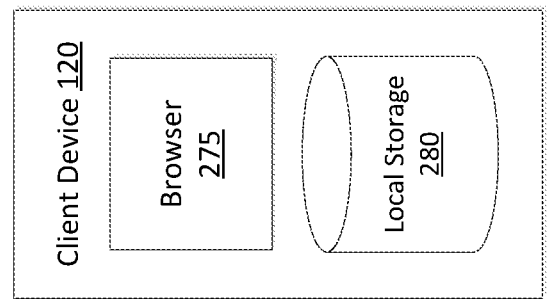
FIG. 2C is a block diagram illustrating the system architecture of client device, in accordance with an embodiment of the invention.
Figure 2B:
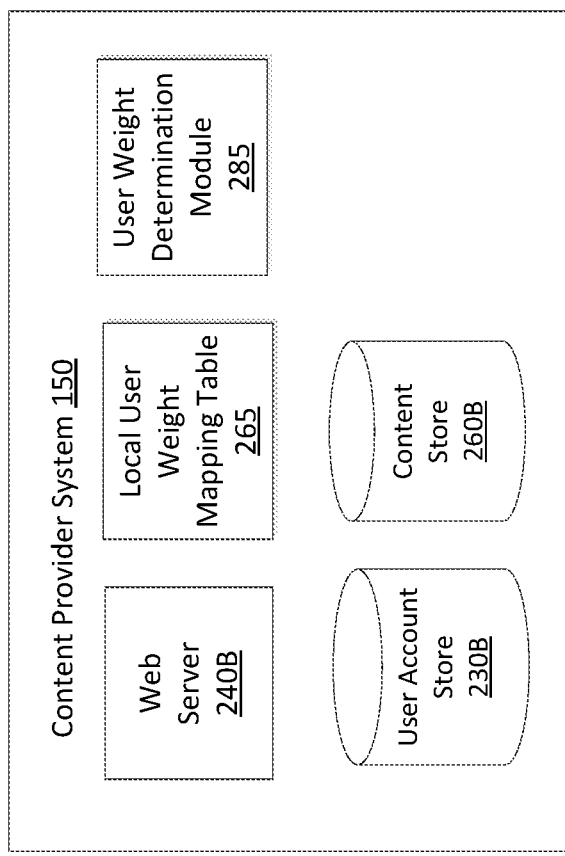
FIG. 2B is a block diagram illustrating the system architecture of a content provider system, in accordance with an embodiment of the invention.

FIGS. 2A-2C illustrate the system architectures of the various systems shown in FIG. 1. In various embodiments, each of the content publishing system 100, the content provider system 150, and the client device 120 may include additional, fewer, or different components. Conventional components such as network interfaces, security functions, load balancers, failover servers, management and network operations consoles, and the like are not shown so as to not obscure the details of the system architectures.

FIG. 2A is a block diagram illustrating the system architecture of a content publishing system, in accordance with an embodiment of the invention. The content publishing system 100 includes a web server 240A, an external system interface 230, a report generation module 235, a content selection module 270, a user identity matching module 250, a user id mapping table 250, a global user weight mapping table 255, a content provider metadata store 245, a user account store 230A, and a content store 160A.

The content publishing system 100 stores content in the content store 160A. The content store 160A stores objects that represent content provided by either users of the content publishing system 100 or by content provider systems 150. The content stored in the content store 160A may include text, images, videos, audio, or combination of various media types.

The user account store 130A stores user profiles storing information describing users of the content publishing system 100. Examples of information stored in a user profile include biographic, demographic, and other types of descriptive information, such as work experience, educational history, gender, hobbies or preferences, location and the like. A user may register with the content publishing system 100 and provide information stored in the user account store 130A as part of the registration. Alternatively, a user may update the user profile after registration. The user account store 130A stores a content publishing system user id for uniquely identifying each user of the content publishing system 100.

The web server 140A receives requests from client devices 120 and processes the received requests by configuring a web page for sending to the requesting client device 120. The web server 140A includes content from content store 160A in the web page. The web server 140A sends the configured web page for presentation via the browser 275 of the client device 120. The browser 275 of the client device 120 receives the web page and renders the web page for presentation via a display screen of the client device 120.

The external system interface 130 allows the content publishing system 100 to interact with external systems, for example, content provider systems 150. The external system interface 130 imports data from content provider systems 150 or exports data to the content provider systems 150. For example, the external system interface 130 imports content items and mapping tables from content provider systems 150. The external system interface 130 exports reports describing content publishing data to content provider systems 150.

The content provider metadata store 245 stores information describing various content provider systems 150. The content provider metadata store 245 stores a content provider system id for uniquely identifying each content provider system 150. The content provider metadata store 245 also stores information used for connecting with the content provider system 150, for example, credentials for establishing a connection with the content provider system 150.

The content publishing system 100 uniquely identifies each user of the content publishing system 100 using a content publishing system user identifier. The content publishing system 100 may assign the content publishing system user identifier to a user when the user registers with the content publishing system 100. The content publishing system 100 uses the content publishing system user identifier to identify the user for subsequent operations performed by the content publishing system 100. For example, if a user creates a new session with the content publishing system 100, the content publishing system 100 determines the content publishing system user identifier for the user based on credentials provided by the user and uses the content publishing system user identifier to identify various user attributes stored in the user account store 130A. The user attributes may be used to select content items provided to the user from the content store 160A.

The user identity matching module 290 matches user identifiers of the content publishing system 100 with corresponding user identifiers of content provider systems 150. The user identity matching module 290 executes the process illustrated in the interaction diagram FIG. 3 for selecting the content item for including in a web page. The user identity matching module 290 stores a user id mapping table 250 that stores mapping from content publishing system user identifiers to content provider system user identifiers. In an embodiment the user id mapping table 250 comprises a first column storing content publishing system user ids, a second column storing a content provider system id (for identifying the content provider system), and a third column storing content provider system user id (for identifying a user within the content provider system). Accordingly, the user id mapping table 250 may store multiple content provider system user identifiers for the same user of the content publishing system 100, each content provider system user identifier received from a different content provider system 150.

The content publishing system 100 further maintains a global user weight mapping table 255 that associates content publishing system user ids with weights received from various content provider systems 150. The content publishing system 100 receives local user weight mapping tables from individual content provider systems and combines the received information to generate the global user weight mapping table 255. The global user weight mapping table 255 includes columns to store content publishing system user identifiers, content provider system identifiers, and user weights received from the content provider systems.

In an embodiment, the content provider system 150 associates pairs of content provider system user identifiers and content items with weights. Accordingly, the content provider system 150 associates the same user with different weights, each weight specified for a specific content item received from the content provider system 150. In these embodiments, the global user weight mapping table 255 includes another column to store the content item id. Examples of user id mapping table 250 and global user weight mapping table 255 are illustrated in FIG. 4.

The content selection module 170 selects a content item from a plurality of content items received from different content provider systems for including in a web page provided to a user. The content selection module 170 executes the process illustrated in FIG. 5 for selecting the content item for including in a web page.

The report generation module 235 prepares reports for a content provider system 150 and provides the reports to the external system interface 230 for sending to the content provider system 150. The reports aggregate information over a plurality of users. As a result, the content provider system 150 is unable to determine user attributes describing specific users presented with content items of the content provider system 150. This allows the content publishing system 100 to maintain privacy of user information, while providing the necessary information describing the distribution of content received from content provider systems to the content provider systems.

FIG. 2B is a block diagram illustrating the system architecture of a content provider system, in accordance with an embodiment of the invention. The content provider system 150 includes a web server 240B, a user account store 230B, a local user weight mapping table 265, a user weight determination module 285, and a content store 260B.

The web server 140B receives requests from client devices and configures web pages for presenting to the users. The web server 140B sends content to a client device for presentation via the browser 275. In an embodiment, the web server 140B includes tracking pixels in the web page provided to the client device 120 such that when the content is presented via the browser 275 of the client device 120, a particular program or code (or set of instructions) is executed by the browser 275. In embodiment, this code associated with the tracking pixel causes a request to be sent to the content publishing system 100. The request triggered by the tracking pixel provides information to the content publishing system 100, for example, the content provider system user id of the user. A tracking pixel may be a transparent 1×1 image, an iframe, or other suitable user interface object.

The content store 160B stores content that is provided to content publishing system 100 for including in the web pages provided by the publishing site 105 to client devices. The content store 160B operates in a manner similar to that described for content store 160A.

The user account store 130B stores information describing users of the content provider system 150. The user account store 130B operates in a manner similar to that described for user account store 130A. The user account store 130B stores a content provider system user id for uniquely identifying each user of the content provider system 150.

The user weight determination module 285 determines weight values for users of the content provider system 150. The user weight determination module 285 monitors user interactions and actions performed by the users to determine weights for the users. For example, a user that makes frequent purchases using the content provider system 150 may be weighted higher than users that rarely make purchases. In an embodiment, the user weight determination module 285 associates pairs of users and content items with weights. Accordingly, a user is associated with a weight for a specific content item. For example, if the user has accessed information associated with a content item multiple times in the past, the user weight determination module 285 may associate that content item for that user with a higher weight. For example, if the content item is associated with a product or service offered by the content provider system 150, and if the user weight determination module 285 determines based on past user actions that the user has shown interest in the product or service, the user weight determination module 285 associates the user with higher weight for that content item. The user weight determination module 285 may determine that the user has interest in a particular product or service if the user performs searches for the product or service via the content provider system 150, the user executes a purchase transaction associated with the product or service, the user previously executed purchases or transactions for the product or service, user accessed information describing the product or service from the content provider system 150, and so on.

The content provider system 150 stores the weights associated with pairs of users and content items in a local user weight mapping table 265. The local user weight mapping table 265 stores columns corresponding to content provider system user ids, content item ids, and weights. A content item id uniquely identifies a content item within the content provider system.

A mapping table such as a local user weight mapping table 265 or global user weight mapping table 255 may be stored using a relational table of a relational database that represents a column of the mapping table using a column of the relational table. Alternatively a mapping table may be represented as text file, for example, a text file storing data using comma separated values.

FIG. 2C is a block diagram illustrating the system architecture of client device, in accordance with an embodiment of the invention. A client device 120 is a computing device configured to receive user input as well as transmit and/or receive data via a network. In one embodiment, the client device 120 is a conventional computer system, such as a desktop or laptop computer. Alternatively, a client device 120 may be a device having computer functionality, such as a personal digital assistant (PDA), a mobile telephone, a smartphone or another suitable device. In one embodiment, a client device 120 executes an application allowing a user of the client device 120 to interact with the content publishing system 100 or the content provider system 150. For example, a client device 120 executes a browser 275 (also referred to as a browser application) to enable interaction between the client device 120 and the content publishing system 10 or the content provider system 150 via a network. In another embodiment, a client device 120 interacts with the content publishing system 100 or the content provider system 150 through an application programming interface (API) running on a native operating system of the client device 120, such as IOS® or ANDROID™.

The client device 120 includes a local storage 280 for storing data. The local storage 280 may store data associated with browser 275. The browser receives web pages from various systems and executes instructions based on the web pages. In an embodiment, the browser 275 stores data received from various online systems in the local storage, for example, for caching data for fast access, or for storing cookies of various websites or online systems. For example, the content publishing system 100 may store user preferences as cookies on the local storage 280 of the client device 120.

The local storage 280 allows web pages received from the content publishing system 100 or the content provider system 150 to store data while executing certain instructions/code. The local storage 280 allocates different portions of the storage space for different websites accessed by the browser 275. The browser 275 enforces access control or security such that a web page from a particular system is not allowed to access data stored in a portion of storage space allocated for a different system. In an embodiment, each system stores data on the client device 120, for example, as cookies. Accordingly, the browser 280 does not allow web pages from one system to access cookies stored for another system.

In one embodiment, the content publishing system 100 sends a browser identifier cookie for storing in the local storage 280 of the client device 120 executing the browser 275. The browser identification cookie includes a browser identifier for uniquely identifying the user of the client device 120. The content publishing system 100 may retrieve the browser identifier from the browser identification cookie until the browser identification cookie is deleted by a user or by the browser 275.

The various systems shown in FIG. 1 communicate via a network (not shown in FIG. 1), which may comprise any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any suitable format, such as hypertext markup language (HTML) or extensible markup language (XML). In some embodiments, all or some of the communication links of the network may be encrypted using any suitable technique or techniques.

Overall Process for Selecting Content for a User

Figure 3:
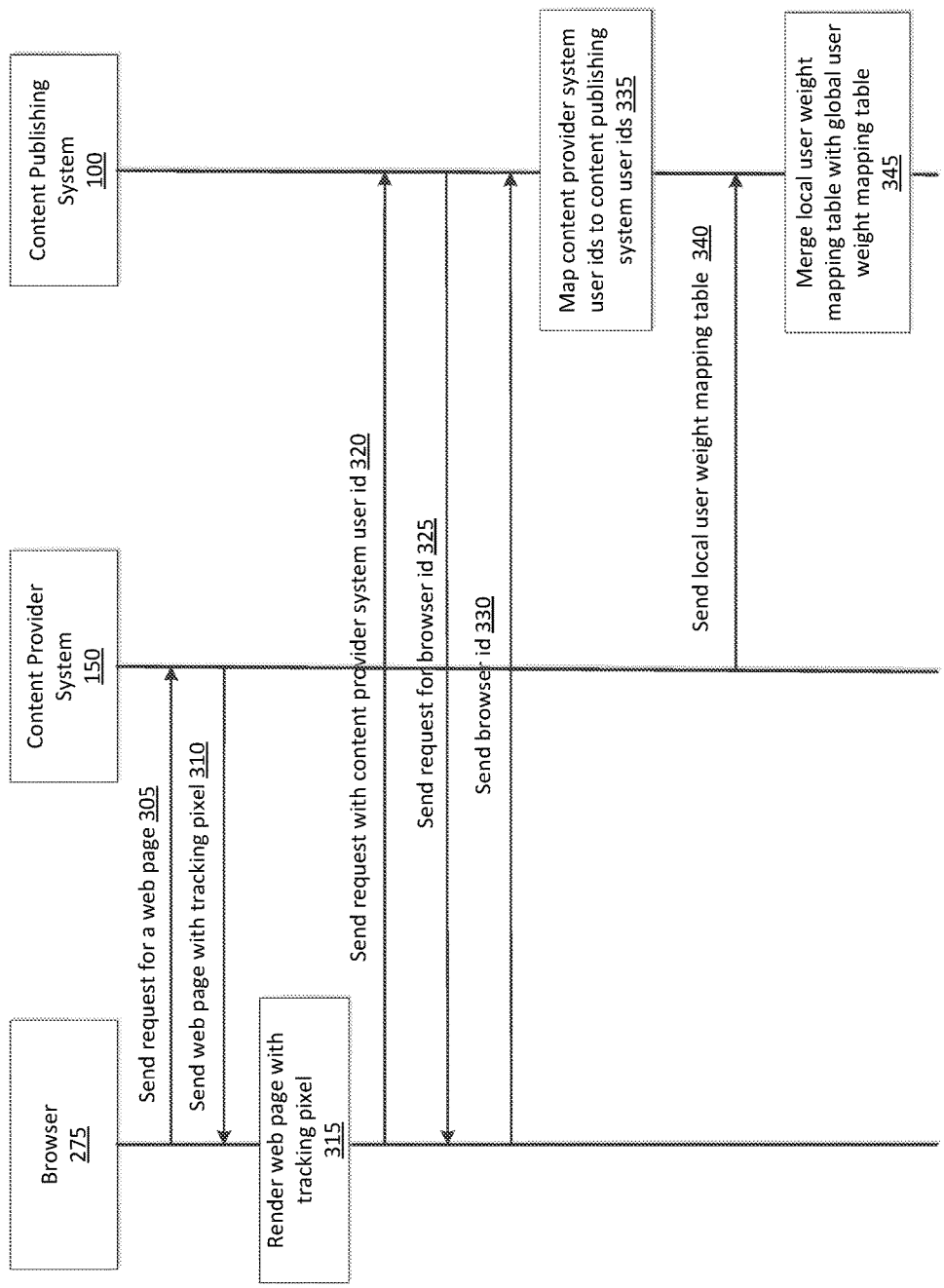
FIG. 3 is an interaction diagram illustrating the process by which a content publishing system associates users of the content publishing system with weights received from content provider systems, in accordance with an embodiment of the invention.

FIG. 3 is an interaction diagram illustrating the process by which a content publishing system associates users of the content publishing system with weights received from content provider systems, in accordance with an embodiment of the invention. The various systems interacting include an online system 100, a content provider system 150, and a browser 275 executing on a client device 120.

The process illustrated in FIG. 3 allows the content publishing system 100 to map content provider system user ids used by the content provider system 150 with content publishing system user ids used by content publishing system 100. The content publishing system 100 associates the two sets of user ids without providing information describing users to the content provider system 150. The content publishing system 100 does not share any information of the users of the content publishing system 100 to maintain privacy of the user information.

The browser 275 executing on a client device 120 sends 305 a request for a web page to the content provider system 150. The browser 275 may send 305 the request for performing certain type of interaction with the content provider system 150, for example, to access information provided by the content provider system 150, to perform a transaction using the content provider system 150, to interact with another user of the content provider system 150, or to use any other functionality offered by the content provider system 150.

The content provider system 150 sends 310 a web page with a tracking pixel to the client device 120. The browser 275 renders 315 the webpage including the tracking pixel. The web page also provides the content provider system user id of the user to the browser 275. The tracking pixel is configured to execute certain instructions when the tracking pixel is rendered. The executed instructions cause the browser 275 to send 320 a request to the content publishing system 100 that provide the content provider system user id of the user of the browser 275 to the content publishing system 100. The request sent 320 by the browser 265 also provides information identifying the client device 120 to the content publishing system 100. If the user is currently logged into the content publishing system 100, the content publishing system 100 determines the content publishing system user id of the user using the client device. Accordingly, the content publishing system 100 maps 335 the determined content publishing system user id with the content provider system user id received from the browser 275 and creates an association between the ids in the user id mapping table 250.

If the user is not currently logged in the content publishing system 100, the content publishing system 100 sends 325 a request to the browser 275. Since the request is sent by the content publishing system 100, the browser 275 can access the browser id of the user previously provided by the content publishing system 100 for storing in the local storage 280. The browser 275 sends 330 the browser id stored in the local storage 180 to the content publishing system 100. The user identity matching module 290 determines the content publishing system user id corresponding to the browser id received from the browser 275. The content publishing system 100 maps 335 the determined content publishing system user id with the content provider system user id received from the browser 275 and creates an association between the ids in the user id mapping table 250. In some embodiments the first request 320 provides the necessary content provider system user id and the browser id to the content publishing system 100. Accordingly, the content publishing system 100 can proceed with mapping 335 the determined content publishing system user id with the content provider system user id without requiring additional communications with the browser, for example, without requiring steps 325 and 330.

The content provider system 150 further sends 340 the local user weight mapping table 265 to the content publishing system 100. The content publishing system 100 receives the local user weight mapping table 265 from the content publishing system 100 and merges 345 the local user weight mapping table 265 with the global user weight mapping table 255.

FIG. 4 illustrates the merging of local user weight mapping tables 265 received from content provider systems into the global mapping table by a content publishing system, in accordance with an embodiment of the invention. The content publishing system 100 maintains the user id mapping table 250 that maps pairs of content provider system user id and content provider system id to a content publishing system user id. The user id mapping table 250 maps uses of the content publishing system 100 to users of different content provider systems. The content publishing system 100 receives local user weight mapping tables 265 from one or more content provider systems 150. The local user weight mapping tables 265 map pairs of content items and users of content provider system to weights associated with the users. In an embodiment, the local user weight mapping table 265 includes a column for the content provider system id.

The content publishing system 100 merges the two tables by determining the content publishing system user id for each row of the local user weight mapping table 265 using the user id mapping table 250. Since the content publishing system 100 received the local user weight mapping table from the content provider system 150, the content publishing system 100 also receives metadata describing the content provider system 150. The content publishing system 100 determines the content provider system id from the content provider metadata store 245 based on the received metadata. The content publishing system 100 checks if the global user weight mapping table 255 includes a row for the identified content publishing system user id, content provider system id, and content item id. If the content publishing system 100 determines that there is an existing row in the global user weight mapping table 255 for the identified content publishing system user id, content provider system id, and content item id, the content publishing system 100 updates the corresponding weight stored in the existing row based on the weight received in the local user weight mapping table. Or else, the content publishing system 100 adds a new row for the identified content publishing system user id and the content provider system id and content item id in the global user weight mapping table 255 and includes the weight received from the local user weight mapping table 265.

Figure 5:
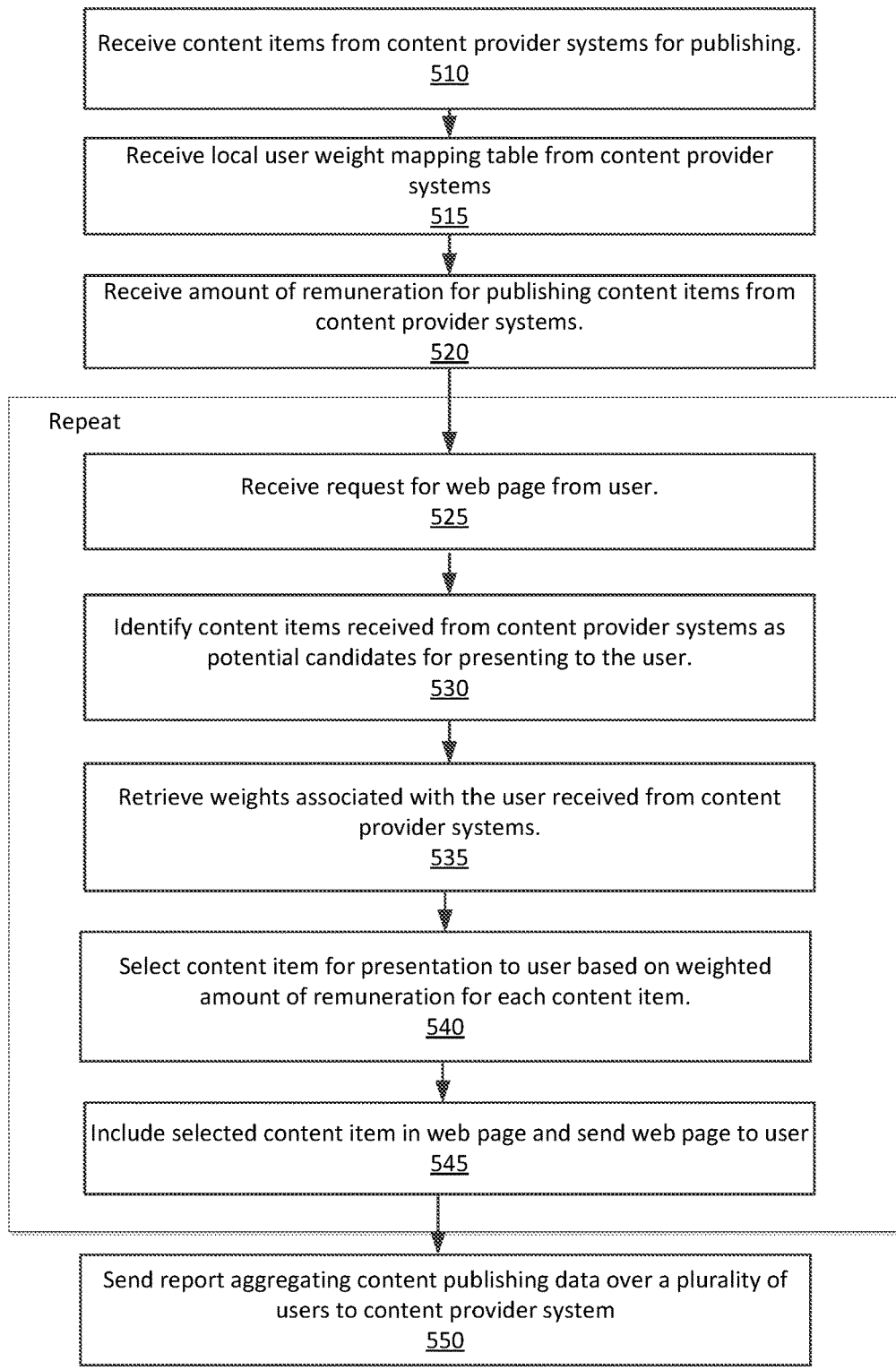
FIG. 5 is a flowchart illustrating the process executed by a content publishing system for selecting content for users based on user weights provided by content provider systems, in accordance with an embodiment of the invention.

FIG. 5 is a flowchart illustrating the process of selecting content for users based on user weights provided by content provider systems, in accordance with an embodiment of the invention. The steps illustrated in FIG. 5 may be executed in an order different from that indicated in FIG. 5. Furthermore, the steps may be executed by modules different from the modules indicated herein.

The external system interface 230 receives 510 content items from content provider systems 150 for publishing. The content publishing system 100 stores the received content items in content store 260A. The content publishing system 100 identifies each content item using a content item id, for example, a name for uniquely identifying each content item. In an embodiment, the content publishing system further receives targeting criteria associated with each content item. The targeting criteria are based on attributes describing the users. The content provider systems 150 provide targeting criteria for each content item identifying attributes of users targeted with that content item.

The external system interface 230 receives 515 local user weight mapping tables 265 from one or more content provider systems 150. In an embodiment, a content provider system 150 sends data representing the local user weight mapping tables 265 as serialized objects, each object representing a portion of the local user weight mapping table 265, for example, a row of the table.

The external system interface 230 receives 520 amounts of remuneration corresponding to various content items from the content provider systems 150. The amount of remuneration represents a value provided by the content provider system 150 to the content publishing system 100 if the content publishing system 100 publishes the content item.

In an embodiment, the amount of remuneration associated with a content item is received with the content item. Accordingly, the amount of remuneration is received in step 510 and the social networking system does not execute the step 520 separate from step 510.

The content publishing system 100 repeats the steps 525, 530, 535, 540, and 545 that select content items for presenting to users via web pages. The content publishing system 100 receives information including the weights associated with the users and the amounts of remuneration in advance of receiving user requests for web pages and in advance of the steps of configuring web pages in which the received information is used. Accordingly, the content publishing system 100 does not receive the weights and amount of remuneration in real time after receiving user requests. As a result, the content publishing system 100 uses the received user weights and amounts of remuneration for a given time interval over a plurality of user requests.

The webserver 240A receives 525 a request for a web page from a client device 120 of user. The client device 120 may send the request for performing an action of the content publishing system 100, for example, to access information, to interact with another user, to comment, to share content, and so on. The content publishing system 100 configures a web page for sending to the client device 120 in response to the request received. The content publishing system 100 includes one or more content items received from content provider systems 150 in addition to including the information or controls based on the request received. These content items may not be requested by the client device 120 but are included so that the content publishing system 100 receives remuneration from the content provider systems 150.

The content publishing system 100 identifies 530 content items received from content provider systems 150 as potential candidates for presenting to the user. In an embodiment, the content publishing system 100 selects content items for which the user sending the request satisfies the targeting criteria. The content publishing system 100 identifies 530 identifies a plurality of content item, each content item received from a different content provider system 150.

The content selection module 270 retrieves 535 weights associated with the user from the global user weight mapping table 255 corresponding to each content item if the content provider system 150 associated with the content item provided a weight for the user for that content item. In an embodiment, if the content selection module 270 doesn't find a value of a weight for the user and a content item, the content selection module 270 assumes a default weight value, for example, one.

The content selection module 270 selects 540 a content item from the potential candidate content items for including in the configured web page based on a weighted amount of remuneration for each content item. For example, if the weight associated with a user for a content item is greater than 1, the content selection module 270 increases the amount of remuneration for that user and the content item by the factor indicated by the weight value. Alternatively, if the weight associated with a user for a content item is less than 1, the content selection module 270 decrease the amount of remuneration for that user and the content item by the factor indicated by the weight value. In an embodiment, the content selection module 270 selects 540 the content item from the plurality of selected content item that maximizes the amount of remuneration received by the content publishing system 100.

The content publishing system 100 includes the selected content item in the web page that is configured. The web server 240A sends the configured web page to the client device that sent the request. The steps 525, 530, 535, 540, and 545 may be repeated for several requests received from users over a time interval, for example, over a day. Accordingly, the content publishing system 100 receives the user weights from content provider systems 150 and reuses the weights for multiple user requests received over a time interval. The report generation module 235 generates and sends 550 reports aggregating content publishing data over a plurality of users to content provider system 150. The reports aggregated over a plurality of users ensure that the content provider system 150 is unable to extract information describing individual users of the content publishing system 100, thereby maintaining privacy of the users of the content publishing system 100.

In some embodiments, the weights in the local user weight mapping tables 265 represent the amount of remuneration. Accordingly, the content provider system 150 provides a value of an amount of remuneration for each user. The content selection module 270 selects 540 the content item for presentation to user based on the received weight for the user for each content item selected as a potential candidate for including in the web page.

Alternative Embodiments

In an embodiment, an amount of remuneration received by the content publishing system 100 from a content provider system 150 is a bid provided by the content provider system for presenting a content item to a client device. The content publishing system 100 receives bids from various content provider systems 100 and selects a content item for including in a web page presented to a user based on the bids. The weights provided by the content provider systems 150 represent user-level bid multipliers. The embodiments allow the content publishing system 100 to receive user-level bid multipliers from content provider systems and select content items based on the bids weighted (or scaled) by the user-level bid multipliers.

The content publishing system 100 includes content items in web pages as impressions of the content items. The content publishing system performs an auction process to select a content item for including in a web page. When the content publishing system 100 identifies an impression opportunity corresponding to a web page being presented to a particular user, the content publishing system 100 system looks up the user identifier, determines there is a bid multiplier for that user from the content provider system. The content publishing system applies that bid multiplier to scale the bid that is submitted by the content provider system into auction for that content item. Since the content publishing system receives the bid multiplier in advance of the impression opportunity becoming available for the user rather than in real time, the content publishing system does not share the user's demographic information with the content provider system. However, the content provider system still has the advantage of being able to scale each bid at a per user level.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, by a content publishing system, from each of a plurality of content provider systems, content items for presenting to users;
receiving, by the content publishing system, one or more mappings from the content provider systems, each mapping associated with a plurality of users and specifying a weight for each of the plurality of users, wherein the weight is determined by at least one of the plurality of content provider systems, wherein the mapping identifies each user using a content provider specific user id, wherein the content publisher identifies users using content publisher user ids;
responsive to a particular user accessing the content provider system via a client device, receiving by the content publishing system, a content provider specific user id for the particular user responsive to the client device receiving a tracking pixel associated with instructions for causing a request to be sent to the content publishing system;
for each user identified in the mapping by a content provider system id, identifying by the content publishing system, a content publisher user id corresponding to the content provider user id;
storing an association between a content provider specific user id for the particular user and the content publisher user id for the particular user;
providing access to content items received from content provider systems to users, comprising, repeatedly:
receiving a request from a user via a client device;
configuring a web page in response to the received request;
identifying a plurality of content items, each content item received from a content provider system;
determining one or more weights associated with the user, each weight obtained from a mapping received from the content provider system that provided an identified content item, wherein the content provider system determines the weight based on one or more user interactions performed by the user in association with the content provider system;
selecting a content item from the identified plurality of content items based on the determined one or more weights;
providing access to the content item via the configured web page; and
sending the configured web page to the user via the client device;
generating a report aggregating information over users provided access to content items from a particular content provider; and
sending the report to the particular content provider.

2. The method of claim 1, further comprising:
for each of one or more content items, receiving a targeting criteria, the targeting criteria specifying attributes of target users for the content item; and
wherein identifying the plurality of content items is responsive to the user satisfying the targeting criteria for each of the plurality of content items identified.

3. The method of claim 2, wherein the targeting criteria for a content item is based on demographic attributes of targeted users for the content item.

4. The method of claim 1, further comprising:
receiving, by the content publishing system from each content provider system, a value of remuneration associated with content items, wherein selecting the content item from the identified plurality of content items comprises:
adjusting values of remuneration for the identified content items based on the determined one or more weights associated with the user;
comparing the adjusted values of remunerations for the identified content items; and
selecting the content item from the identified plurality of content items based on the comparison.

5. The method of claim 1, wherein a mapping associates a pair comprising a user and a content item with a weight.

6. The method of claim 1, wherein the one or more user interactions comprises a search performed by the user for a particular product or service of the content provider system, the product or service associated with a content item of the content provider system.

7. The method of claim 1, wherein a user interaction comprises a transaction associated with particular product or service of the content provider system, the product or service associated with a content item of the content provider system.

8. The method of claim 1, wherein determining the content publisher user id for the particular user comprises:
receiving a browser id stored on the client device from the client device, wherein the browser id is stored as a cookie on the client device by the content publishing system; and
determining, by the content publishing system, a content publisher user id corresponding to the browser id.

9. The method of claim 1, wherein the report comprises a count of users receiving a particular content item from the content provider.

10. A non-transitory computer readable storage medium, storing instructions for:
receiving, by a content publishing system, from each of a plurality of content provider systems, content items for presenting to users;
receiving, by the content publishing system, one or more mappings from the content provider systems, each mapping associated with a plurality of users and specifying a weight for each of the plurality of users, wherein the weight is determined by at least one of the plurality of content provider systems, wherein the mapping identifies each user using a content provider specific user id, wherein the content publisher identifies users using content publisher user ids;
responsive to a particular user accessing the content provider system via a client device, receiving by the content publishing system, a content provider specific user id for the particular user responsive to the client device receiving a tracking pixel associated with instructions for causing a request to be sent to the content publishing system;
for each user identified in the mapping by a content provider system id, identifying by the content publishing system, a content publisher user id corresponding to the content provider user id;
storing an association between a content provider specific user id for the particular user and the content publisher user id for the particular user;
providing access to content items received from content provider systems to users, comprising, repeatedly:
receiving a request from a user via a client device;

configuring a web page in response to the received request;

identifying a plurality of content items, each content item received from a content provider system;

determining one or more weights associated with the user, each weight obtained from a mapping received from the content provider system that provided an identified content item, wherein the content provider system determines the weight based on one or more user interactions performed by the user in association with the content provider system;

selecting a content item from the identified plurality of content items based on the determined one or more weights;

providing access to the content item via the configured web page; and sending the configured web page to the user via the client device;

generating a report aggregating information over users provided access to content items from a particular content provider; and sending the report to the particular content provider.

11. The non-transitory computer readable storage medium of claim 10, further storing instructions for:

for each of one or more content items, receiving a targeting criteria, the targeting criteria specifying attributes of target users for the content item; and wherein identifying the plurality of content items is responsive to the user satisfying the targeting criteria for each of the plurality of content items identified.

12. The non-transitory computer readable storage medium of claim 10, further storing instructions for:

receiving, by the content publishing system from each content provider system, a value of remuneration associated with content items, wherein selecting the content item from the identified plurality of content items comprises:

adjusting values of remuneration for the identified content items based on the determined one or more weights associated with the user;

comparing the adjusted values of remunerations for the identified content items; and selecting the content item from the identified plurality of content items based on the comparison.

13. The non-transitory computer readable storage medium of claim 10, wherein a mapping associates a pair comprising a user and a content item with a weight.

14. The non-transitory computer readable storage medium of claim 10, wherein a content provider system determines the weight for a user based on user interactions performed by the user with the content provider system, wherein a user interaction comprises, one of:

a search performed by the user for a particular product or service of the content provider system, the product or service associated with a content item of the content provider system, or a transaction executed by the user, the transaction associated with particular product or service of the content provider system, the product or service associated with a content item of the content provider system.

15. The method of claim 1, further comprising:

for each of a plurality of content provider systems, responsive to the particular user accessing the content provider system via the client device, receiving by the content publishing system, a content provider specific user id for the particular user, the content provider specific user ids provided by the content provider system;

storing, in a global mapping table, an association between a content publisher user id for the user and each of the plurality of content provider specific user ids for the user; and wherein determining one or more weights associated with the user is based on the global mapping table.

\* \* \* \* \*